June 27, 1939.   M. D. RUST   2,164,086

VARIABLE SPEED TRANSMISSION

Filed May 18, 1935   6 Sheets-Sheet 1

INVENTOR
Mack D. Rust

June 27, 1939.  M. D. RUST  2,164,086
VARIABLE SPEED TRANSMISSION
Filed May 18, 1935    6 Sheets-Sheet 2

INVENTOR
Mack D. Rust

INVENTOR
Mack D. Rust

June 27, 1939.  M. D. RUST  2,164,086
VARIABLE SPEED TRANSMISSION
Filed May 18, 1935  6 Sheets-Sheet 4

Fig. 7

INVENTOR
Mack D. Rust

Fig. 8

June 27, 1939.　　　　　M. D. RUST　　　　　2,164,086

VARIABLE SPEED TRANSMISSION

Filed May 18, 1935　　　　6 Sheets-Sheet 6

INVENTOR
Mack D. Rust

Patented June 27, 1939

2,164,086

UNITED STATES PATENT OFFICE 2,164,086

VARIABLE SPEED TRANSMISSION

Mack D. Rust, Memphis, Tenn., assignor of one-half to Daniel C. Hoffman, Philadelphia, Pa., and one-half to Alda V. Bedford, Collingswood, N. J.

Application May 18, 1935, Serial No. 22,157

21 Claims. (Cl. 74—124)

The present invention relates to power transmitting devices and more particularly to a variable speed transmission system.

An object of the present invention is to provide an improved variable speed transmission in which rotary motion is transformed into an oscillatory motion and back to a rotary motion at an adjustable speed.

In previous transmissions which accomplish this object, the motion of the driven oscillatory members is non-uniform during the power stroke (for most speed ratio settings), which results in the output shaft being driven non-uniformly as by a series of jerks, even though the power strokes are made to overlap. In the present invention, the motion of the driven oscillatory members is uniform during the power stroke, which results in uniform flow of power and in uniform speed of the output shaft.

Another object of the present invention, therefore, is to provide a transmission of the oscillatory type in which the instantaneous ratio of the speed of the output shaft to the speed of the input shaft is fixed for any given setting of speed ratio.

Another object of the present invention is to provide an improved variable speed transmission in which rotary motion is transformed into an oscillatory motion.

Another object of the invention is to provide a novel mechanism for transforming rotary motion into oscillatory motion and for varying the extent of the oscillations.

Another object of the invention is to provide a novel one-way drive clutch.

Another object of the invention is to provide a novel power transmission system which employs a one-way drive clutch and cams so shaped as to transmit power uniformly from one shaft to another.

Another object of the invention is to provide a novel variable speed transmission system in which the speed of the driven shaft may be varied from rest to full speed in an infinite number of steps and without interrupting the transmission of power.

Another object of the invention is to provide a novel coupling means whereby a first member may drive a second member synchronously with an adjustable angular displacement between the two members.

Another object of the invention is to provide a novel variable speed transmission system in which part of the total power is transmitted by a fixed speed ratio mechanism.

Further objects and advantages of my invention will be apparent to those skilled in the art from the following description of the preferred embodiments of the invention described with reference to the accompanying drawings wherein like numerals designate like or corresponding parts in the several views, and in which:

Particular reference is now made to Figs. 1, 3, 4, and 5, in which numerals 20 designate a case or container for enclosing and supporting the transmission to be described herewith. A detachable cover 21 forms part of the enclosing and supporting structure. A shaft 60 is the input shaft of the transmission, and is rotatably supported at one end by a bearing 61 in the case 20 and at the other end by a bearing 62 in the cover 21. Axial movement of the shaft 60 is prevented by two collars 67 fastened to said shaft adjacent said bearings. Two driving cams 64 and 50, identical in shape and size, are securely fastened to the input shaft 60 in spaced relation, one of said cams being 180 degrees in advance of the other cam.

Figure 1:
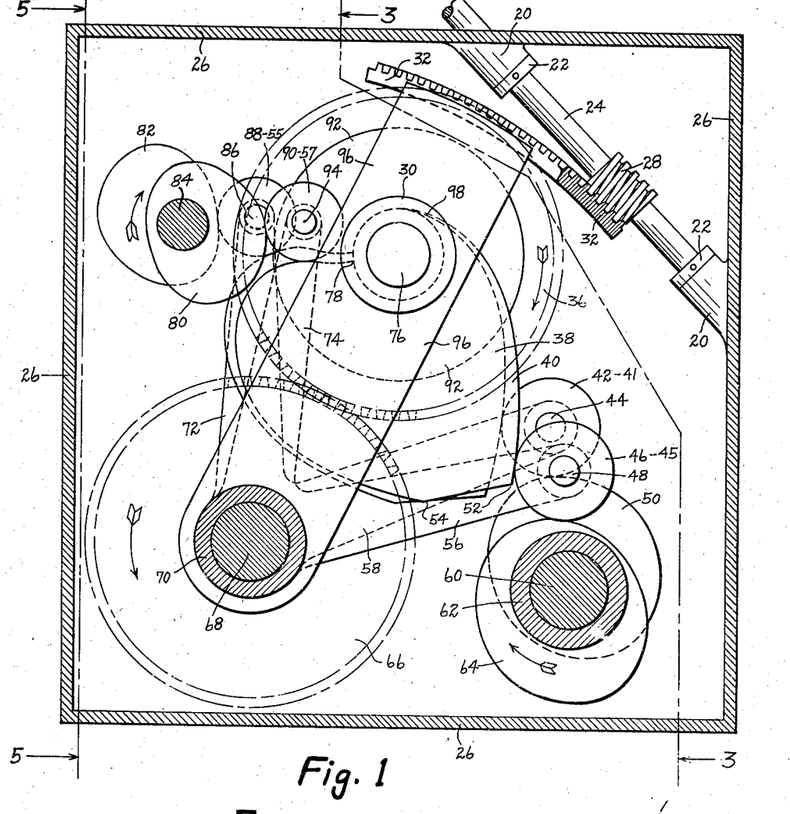
Fig. 1 is an end view, partly in section, of the preferred embodiment of my invention, taken on the line 1—1 of Figs. 3 and 5, looking in the direction of the arrows.
Figure 3:
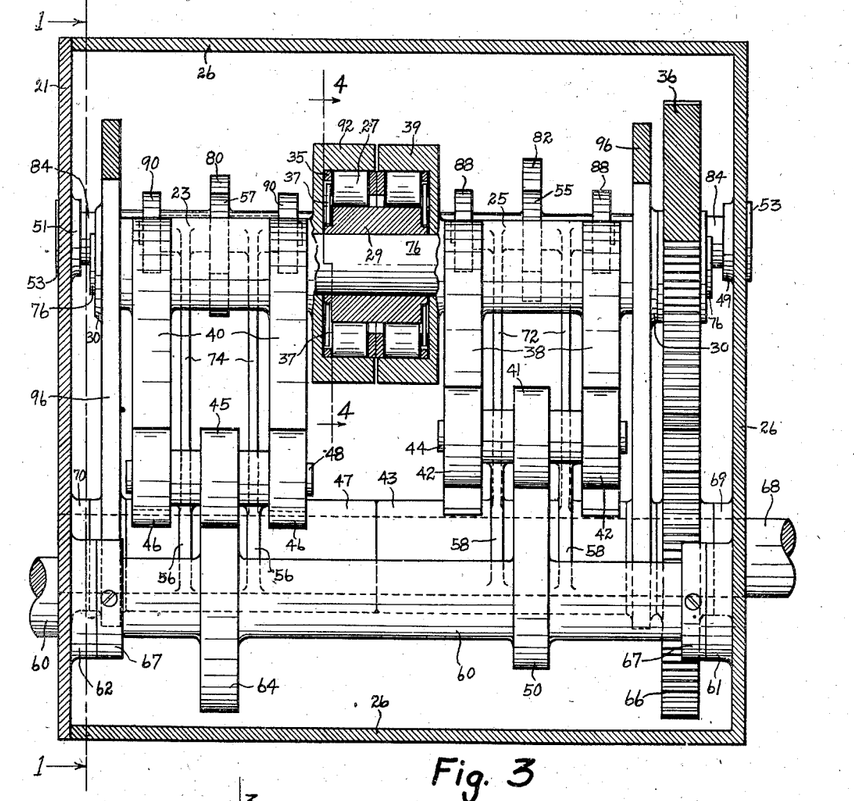
Fig. 3 is a sectional view of the embodiment shown in Fig. 1 taken on the line 3—3 of Fig. 1, looking in the direction of the arrows.
Figure 4:
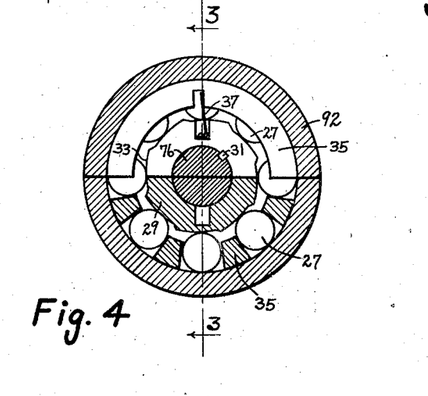
Fig. 4 is a sectional view of the one-way drive clutch, taken on the line 4—4 of Fig. 3, looking in the direction of the arrows.
Figure 5:
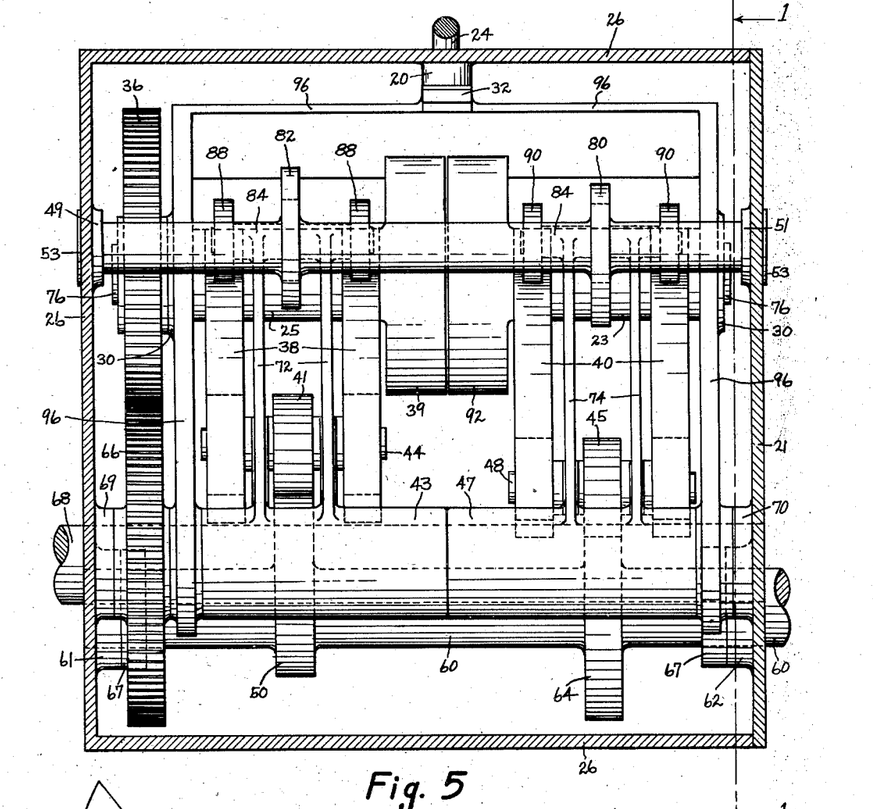
Fig. 5 is a sectional view of the embodiment shown in Fig. 1 taken on the line 5—5 of Fig. 1, looking in the direction of the arrows.

A shaft 68 is the output shaft of the transmission, and is rotatably supported at one end by a bearing 69 in the case 26 and at the other end by a bearing 70 in the cover 21. Upon the output shaft 68 between said bearings are rotatably supported two sleeves 47 and 43 and a U-shaped frame 96. A driven gear 66 is keyed to the output shaft 68, and it is evident that axial movement of said shaft is prevented by the assembly described.

A bifurcated arm 56 securely fastened to the sleeve 47 perpendicular to the axis thereof supports at its extremity a shaft 48 upon which a roller 45 and a pair of rollers 46 are rotatably mounted. The roller 45 rolls upon the face of the driving cam 64 and is in constant engagement therewith. Similarly, a bifurcated arm 58 securely fastened to the sleeve 43 supports at its extremity a shaft 44 upon which a roller 41 and a pair of rollers 42 are rotatably mounted. The roller 41 rolls upon the face of the driving cam 50 and is in constant engagement therewith.

Securely fastened to the center of the U-shaped frame 96 is a sector 32 of a worm wheel having as its center of rotation the axis of the output shaft 68. Meshed with the sector 32 is a worm 28 rigidly fastened to a shaft 24 supported by two suitable bearings 20 in the case 26. Two collars 22 prevent axial movement of the shaft 24.

An intermediate shaft 76 is rotatably supported by suitable bearings 30 in the frame 96. A driving gear 36 in constant mesh with the driven gear 66 is securely fastened to a projection of the said intermediate shaft. Upon the intermediate shaft 76 are rotatably mounted two intermediate oscillatory members operatively connected to said shaft by a pair of one-way drive clutches. One of the said oscillatory members consists of two double-faced driven cams 40, identical in size and shape, securely fastened to a sleeve 23 with no angular displacement between them, and the driving member 92 of one of the said pair of one-way drive clutches. The other oscillatory member consists of two double-faced driven cams 38, identical in size and shape, similarly fastened to the sleeve 25, and the driving member 39 of the other one-way drive clutch. The two pairs of cams 38 and 40 are identical in size and shape. The rollers 42 roll upon the faces of the cams 38 and are in constant engagement therewith. Similarly, the rollers 46 roll upon the similar faces of the cams 40. It should be noted that the pair of cams 38 and the associated pair of rollers 42 act as one cam and one roller and shall hereinafter be referred to as the driven cam 38 and the roller 42. Likewise, the pair of cams 40 and the associated pair of rollers 46 shall hereinafter be referred to as the driven cam 40 and the roller 46.

One of the said pair of one-way drive clutches is in the form of a plurality of rollers 27 positioned between the driving member 92 and the cooperating cam surfaces 33 formed on a driven member 29, which member is securely fastened to the intermediate shaft 76 by means of a key 31. The rollers 27 are positioned in suitable openings formed in an annular cage member 35 and held in spaced relation thereby. The cage member 35 is rotatably supported in the driving member 92, and is continuously urged in a clockwise direction (with reference to Fig. 4) to operatively engage the rollers 27 with the cam surfaces 33 by springs 37 in cutaway portions of said cage member and said driven member. The construction of the cam surfaces 33 is such that they converge toward the center of the shaft 76 in a counter-clockwise direction as viewed in Fig. 4. The other of said pair of one-way drive clutches is similar in all respects to the clutch described in detail. It is apparent from the foregoing description that the oscillations of the two intermediate oscillatory members will be transmitted to the shaft 76 in the form of uni-directional rotational movement through the one-way drive clutches.

An idler shaft 84 is rotatably supported at one end by a bearing 49 in the case 26 and at the other end by a bearing 51 in the cover 21. Axial movement of said idler shaft is prevented by two caps 53 which cover the ends of said bearings. Two idler cams 80 and 82, identical in size and shape, are securely fastened to the idler shaft 84 in spaced relation, one of said cams being 180 degrees in advance of the other cam.

A bifurcated arm 74 securely fastened to the sleeve 47 perpendicular to the axis thereof supports at its extremity a shaft 94 upon which a roller 57 and a pair of rollers 90 are rotatably mounted. The roller 57 rolls upon the face of the idler cam 80 and the rollers 90 roll upon the face 54 to 78 of the driven cam 40. Similarly, a bifurcated arm 72 securely fastened to the sleeve 43 supports at its extremity a shaft 86 upon which a roller 55 and a pair of rollers 88 are rotatably mounted. The roller 55 rolls upon the face of the idler cam 82 and the rollers 88 roll upon the similar face of the driven cam 38. Each of the said rollers is in constant engagement with the face of its associated cam.

In operation, the rotation of the input shaft 60 in the direction indicated by the arrow in Fig. 1 causes the driving cam 64, which engages the roller 45 mounted on the arm 56, to oscillate the said arm about the output shaft 68. The oscillation of the arm 56 causes the roller 46 mounted thereon to oscillate the intermediate oscillatory member consisting of the cam 40, the sleeve 23, and the member 92, about the intermediate shaft 76. In a similar manner, the driving cam 50, which engages the roller 41 mounted on the arm 58, causes the said arm to oscillate about the output shaft 68. The oscillation of the arm 58 causes the roller 42 mounted thereon to oscillate the other intermediate oscillatory member consisting of the cam 38, the sleeve 25, and the member 39, about the shaft 76. Each of the driving cams 64 and 50 has a rising portion adapted for driving the engaged roller and its associated intermediate oscillatory member in a power stroke for more than 180 degrees of rotation of said driving cam. Then, since the driving cams 64 and 50 are disposed 180 degrees apart in angular position, one or the other, or both, of the intermediate oscillatory members always drives the intermediate shaft 76 through the two one-way drive clutches, causing continuous rotation of said shaft in the direction indicated by the arrow in Fig. 1. The intermediate shaft 76 drives the output shaft 68 by means of the two meshed gears 36 and 66.

The total throw of the driving cam 64 is such that the roller 46 rolls over only a small portion of the face 52 to 98 of the driven cam 40. The shape of said driven cam is such that its amplitude of oscillation and hence the speed ratio between the output shaft 68 and the input shaft 60 is determined by the portion of said face over which the roller 46 rolls during a complete revolution of the driving cam 64. This said small portion will hereinafter be referred to as the working portion. Said speed ratio is alterable by shifting said working portion along the face 52 to 98 of the driven cam 40 by moving the center of rotation of said driven cam toward or away from the roller 46 and meanwhile permitting rotation of said driven cam such as to maintain contact with said rollers.

Since the driven cam 40 is rotatable about the intermediate shaft 76 supported by the adjustable frame 96, a change in speed ratio is effected by moving said frame. This adjustment is accomplished by means of the worm wheel sector 32 and the worm 28 which operate to change the angular position of said frame about the output shaft 68. Since the center of rotation of said frame is coaxial with the center of the driven gear 66, the driving gear 36 is in constant mesh with said driven gear and capable of driving the same while an adjustment of the speed ratio is being made. The worm 28 may be driven by any suitable means, such as a handwheel or a motor, connected to the shaft 24 extending beyond the case 26.

It is apparent from the construction of the transmission that when the working portion of the face 52 to 98 of the driven cam 40 is being shifted by the adjustable frame 96 to alter the speed ratio, the corresponding working portion of the face of the driven cam 38 is simultaneously shifted a like amount in the same direction by said adjustable frame.

As the rollers 46 and 42 can drive the engaged driven cams 40 and 38 only during the power stroke, other means must be provided to drive said driven cams during the return stroke, which return stroke occurs when the rollers 45 and 41 roll over the falling portions of the driving cams 64 and 50, respectively. The return means provided includes the bifurcated arms 74 and 72, idler shaft 84, the idler cams 80 and 82, the rollers associated therewith, and the faces of the driven cams 40 and 38 with which said rollers are engaged.

The angular positions of the idler cams 80 and 82 with respect to the angular positions of the driving cams 64 and 50 are such that when said driving cams are engaged in power strokes, the rollers 57 and 55, rolling over the falling portions of their respective idler cams 80 and 82, drive said idler cams. Since each power stroke is effective for at least 180 degrees of rotation of said driving cams, and since the power strokes occur 180 degrees apart, the idler shaft 84 is driven continuously in the direction of rotation indicated by the arrow in Fig. 1. Hence, when the rollers 57 and 55 roll over the rising portions of the idler cams 80 and 82, the associated rollers 90 and 88 drive the engaged driven cams 40 and 38 during their respective return strokes.

Figure 1A:
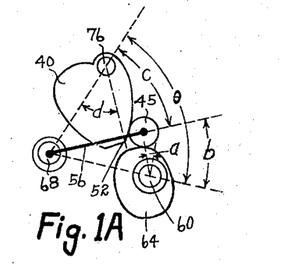
Fig. 1A is a schematic diagram showing angular relations between certain members of the embodiment shown in Fig. 1.

In order to insure the rotation of the output shaft 68 at uniform speed, the shape of the driving and driven cams are carefully made in accordance with the mathematical law upon which proper operation of the transmission is dependent. The particular mathematical law used to determine the shape of the cams must be such that the amplitude of oscillation of the driven cam 40 can be varied by shifting the working portion along the face 52 to 98 and at the same time must be such that uniform rotation of the driving cam 64 will cause uniform rotation of said driven cam during the entire power stroke. The logarithmic law is one law (and probably the only law) that meets the requirements as will be evident from the following analysis applicable to a single power stroke. Referring to Fig. 1A:

Let $a$ = the angular displacement of the input shaft 60 from its position at the beginning of the power stroke;

$b$ = the displacement of the arm 56 measured as the angle between a line joining the centers of the output and input shafts 68 and 60, respectively, and a line joining the centers of the output shaft 68 and the roller 45 (all angles are measured in the plane of Fig. 1);

$c$ = the displacement of the arm 56 measured as the angle between a line joining the centers of the output shaft 68 and the roller 45 and a line joining the centers of the output shaft 68 and the intermediate shaft 76; and $d$ = the displacement of the driven cam 40 measured as the angle between a line joining the centers of the output shaft 68 and the intermediate shaft 76 and a line joining the center of the intermediate shaft 76 and the end 52 of the cam face.

The shape of the driving cam 64 is such that $$m(j+b) = \log_k ha \qquad (1)$$

in which $m$, $j$, and $h$ are constants and $k$ is any logarithmic base.

The shape of the face 52 to 98 of the driven cam 40 is such that $$m(p-c) = \log_k qd \qquad (2)$$

in which $p$ and $q$ are constants.

By the mathematical definition of logarithms, $$ha = k^{m(j+b)} \qquad (3)$$

and $$qd = k^{m(p-c)} \qquad (4)$$

It is evident from Fig. 1 that, for any given position of the adjustable frame 96, even while the arm 56 oscillates about the output shaft 68, $$b+c = \theta \text{ or } -c = b-\theta \qquad (5)$$

in which $\theta$ is a constant.

Adding $j$ and $p$ to both sides of Equation 5, $$j+p-c = j+p+b-\theta \qquad (5A)$$

Multiplying through by $m$ and regrouping, $$m(p-c) = m(j+b) + m(p-j-\theta) \qquad (6)$$

Substituting the value of $m(p-c)$ from Equation 6 into Equation 4, $$qd = k^{m(j+b)+m(p-j-\theta)} \qquad (7)$$

from which $$qd = k^{m(j+b)} \times k^{m(p-j-\theta)} \qquad (8)$$

Substituting the value of $k^{m(j+b)}$ from Equation 3 into Equation 8, $$qd = ha \times k^{m(p-j-\theta)} \qquad (9)$$

Dividing through by $qa$, $$\frac{d}{a} = \frac{h}{q} \times k^{m(p-j-\theta)} \qquad (10)$$

It is evident from Equation 10 that, during the power stroke, the ratio of the angular displacement ($d$) of the driven cam 40 to the angular displacement ($a$) of the input shaft 60 is a constant, since $h$, $q$, $k$, $m$, $p$, and $j$ are all design constants and $\theta$ is a constant for any given position of the adjustable frame 96. Hence if the input shaft 60 is rotated at constant speed, the driven cam 40, acting through the one-way drive clutch, will drive the intermediate shaft 76 at constant speed during said power stroke.

It is further evident from Equation 10 that the speed ratio may be changed by changing the value of the constant $\theta$. In the embodiment shown in Fig. 1, the speed ratio is changed by shifting the angular position of the adjustable frame 96. It should be noted that such shifting, as previously described, results in the simultaneous and equal shifting of the center of oscillation of both driven cams 38 and 40 so that changing the speed ratio of the transmission causes no discontinuity in the transmission of driving torque and no abrupt change in speed ratio. Since the adjustable frame 96 may occupy any one of an infinite number of positions between its two extreme positions, thereby causing the constant $\theta$ to have any one of an infinite number of possible values between its two extreme values, it is evident that my improved transmission is "infinitely variable" in speed ratio.

In the foregoing analysis, the several constants $h$, $q$, $k$, $m$, $p$, and $j$ give the design flexibility and still permit the mechanism to have the advantages cited. For example, constants $m$, $h$, and $q$ in Equations 1 and 2 permit the use of any units of angular measure in the design of the cams. The constant $j$ permits the effective face of the driving cam at the start of the stroke to have any radius, whereas the constant $p$ permits a choice of suitable overall dimensions of the driving cam.

In the embodiment shown in Fig. 1 (which is drawn to scale), the design of the driven cam 40 is such that a small increment of angular motion of the arm 56 when one extreme 98 of the face of said driven cam is engaged will cause 16 times as much angular motion of said driven cam as is caused by an equal increment of angular motion of the arm 56 when the other extreme 52 of the face is engaged. The design of the driving cam 64 is such that a small increment of angular motion of said driving cam will cause two times as much angular motion of the arm 56 at the start of the power stroke as is caused by an equal increment of angular motion of said driving cam at the finish of the power stroke. The result of this particular design is that the maximum speed ratio of the transmission is 16/2 or 8 times the minimum speed ratio. The actual extreme speed ratios of input to output shafts obtainable are 1:1/4 and 1:1/32.

Continuing my mathematical discussion, it is well known that the logarithmic function of a variable number may be expressed by citing the way in which the value of the variable number increases (or decreases) for uniform increments in the value of said function. For example, if the exponent $m(j+b)$ of $k$ in Equation 3, which is equivalent to Equation 1, is given values representing uniform numerical steps, such as $s+t$, $s+2t$, $s+3t$, $s+4t$, etc., the corresponding values of $ha$ (Equation 3) are each a fixed constant times the value of $ha$ before the addition of each increment in turn, i. e., each new value of $ha$ is $k^t$ times as great as the immediately preceding value of $ha$. Also, each increment of $ha$ is a fixed constant times the immediately preceding increment. This may be demonstrated by letting the exponent of $k$ begin at any arbitrary value $s$ and increase by equal steps, such as $t$. Then the ratio of any increment to the immediately preceding increment is:

$$\frac{k^{s+(n+3)t} - k^{s+(n+2)t}}{k^{s+(n+2)t} - k^{s+(n+1)t}} = \frac{k^{2t} - k^t}{k^t - 1} = k^t \quad (11)$$

which is a constant.

The foregoing discussion concerns the shape of the portion of the driving cam 64 which engages the associated roller during the power stroke. The portion of the cam 64 engaged between the finish of a power stroke and the start of the following power stroke is effective during the return stroke. Immediately following the power stroke, the point of contact of the cam 64 and roller 46 continues to rise, but at a decreasing rate, reaches a peak, gradually falls to a minimum, and then rises to the start of the power stroke. During said return stroke, the arm 56 and the driven cam 40 are caused to decelerate smoothly, to accelerate in the reverse direction, to decelerate again, and to accelerate again in the initial direction to the speed required at the start of the power stroke. The use of uniform acceleration and deceleration characteristics during the said return stroke may serve to reduce vibration and excessive forces due to inertia. Such design is well known in the art.

The shape of the face 54 to 78 of the driven cam 40 is such that the roller 90 is in constant engagement therewith while roller 46 rolls along the face 52 to 98 of said driven cam with the angle between the arm 56 and the arm 74 fixed. The shape of the idler cams 80 and 82 is such that the faces of said cams are in constant engagement with their respective rollers while the idler shaft 84 rotates at the same speed as the input shaft 60. The shaft of the said idler cams therefore follows a law which is similar to that used to determine the shape of the driving cams 64 and 50. In another design, the shape of the idler cams might be made such that constant contact with their respective rollers is maintained while the speed of said idler cams varies during each revolution but averages the same as that of the input shaft for each whole revolution. The result would be acceleration and deceleration of the idler cams producing forces which might be used to cyclicly load the mechanism and thereby prevent the idler cams from running ahead during the brief interval of each revolution when the power strokes of the driving cams 64 and 50 overlap.

Figure 2:
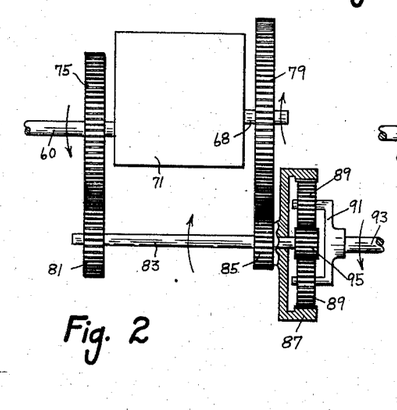
Fig. 2 is a plan view of the preferred embodiment used in conjunction with a differential mechanism.

A variable speed transmission system in which the speed of the driven shaft may be varied from zero to full speed is shown schematically in Fig. 2, to which particular reference is now made. The rectangle marked 71 represents my improved variable speed transmission (described above with reference to Figs. 1, 3, 4, and 5) having an input shaft 60 and an output shaft 68. Keyed to the said input shaft is a gear 75 in mesh with a gear 81 keyed to an intermediate shaft 83. Keyed to the output shaft 68 is a gear 79 meshed with a gear 85 rotatably supported by said intermediate shaft and securely fixed to an internal gear 87 also rotatably supported by the shaft 83. The internal gear 87 drives a planetary gear system comprising the sun gear 95 keyed to the intermediate shaft 83, a plurality of planet gears 89 meshed with said sun gear and with said internal gear, and the spider 91 upon which the planet gears 89 are rotatably supported. The spider 91 is keyed to the driven shaft 93, which is the output shaft of the transmission system. Suitable bearings not shown in the schematic diagram are provided to rotatably support the said intermediate and driven shafts.

In operation, the sun gear 95 is driven at a fixed speed ratio by the input shaft 60 through the gears 75 and 81. The internal gear 87 is driven at a variable speed ratio by the input shaft 60 through the variable speed transmission 71 and the gears 79 and 85. As shown by the arrows, the gears 85 and 87 rotate in opposite directions. The gear 87 tends to rotate the spider 91 and shaft 93 in the direction indicated by the arrow, whereas the gear 95 tends to rotate said spider and shaft in the opposite direction. The gear ratios are such that when the speed ratio of the transmission 71 is at the minimum obtainable value, the driving effect of the gear 87 is equal to the driving effect of the gear 95, with the net result that the speed of the output shaft 93 is zero. Hence, the speed ratio of the input shaft 60 to the output shaft 93 is 1:0.

As the speed ratio of the transmission 71 is increased, the speed of the gear 87 is increased without changing the speed of the sun gear 95. Hence the driving effect of the gear 87 is greater than the driving effect of the gear 95 with the net result that the output shaft 93 is driven in the direction indicated by the arrow.

In the particular design shown in Fig. 2, the speed of the gear 95 is twice that of the input shaft 60, and the speed of the internal gear 87 is four times that of the gear 79. The pitch diameter of the gear 87 is four times the pitch diameter of the gear 95. Then since the actual extreme speed ratios of the transmission 71 are 1:1/4 and 1:1/32, the net extreme ratios obtainable by the use of the arrangement shown in Fig. 2 are 1:0.7 and 1:0. Hence, the range of speed ratios obtained is greater than the range obtained by the transmission 71 acting alone.

The internal gear 87 and the planetary gear system comprise a differential mechanism which differs from the usual form well known in the automotive art in that no two of the three shafts have the same speed ratio with respect to the third shaft. (The short coupling between the gears 85 and 87 is here considered a shaft.) The advantage of this form of differential mechanism in this transmission system is that friction and wear are slight because only a small portion of the total power is transmitted by rotation of the sun gear 95.

Figure 2A:
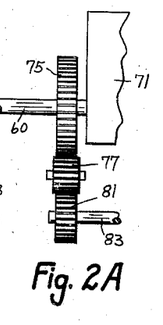
Fig. 2A is a plan view of part of the same, showing a slight modification.

By interposing an idler gear 77 between the gears 75 and 81, as shown in Fig. 2A, it is possible to reduce the amount of power transmitted by the variable speed transmission 71 relative to the total amount of power transmitted. The input shaft 60 will drive the intermediate shaft 83 in a direction opposite to that indicated by the arrow in Fig. 2. The sun gear 95 and the gear 87, therefore, tend to rotate the spider 91 and the shaft 93 in the same direction (as shown by the arrow). Hence the driving effects of the gears 87 and 95 are additive. The result of the added rotational effect of the shaft 83 and the sun gear 95 is that the speed of the output shaft 93 is increased for all speed ratio settings of the variable speed transmission 71. The range of speed ratios obtainable is therefore made less than the range obtained by the transmission 71 acting alone.

Figure 7:
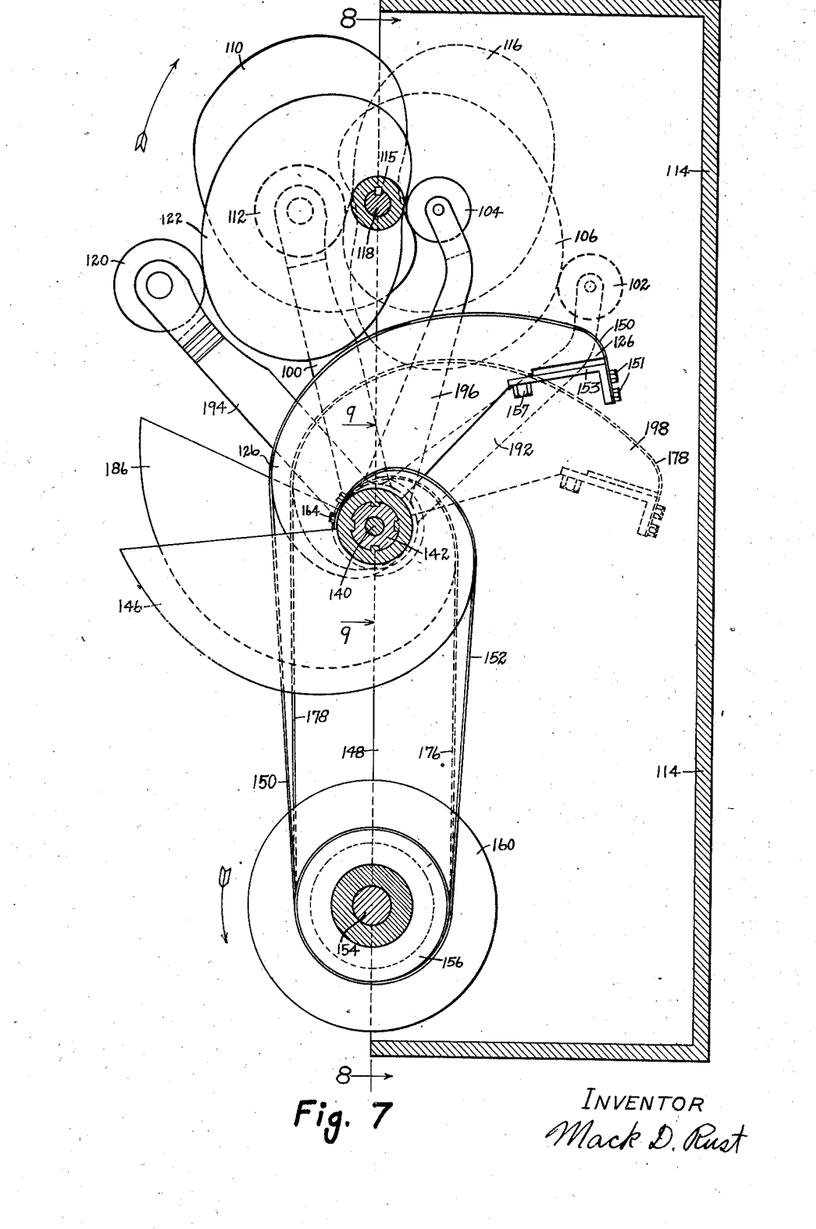
Fig. 7 is a view of a second embodiment of my invention, taken on the line 7—7 of Fig. 8, looking in the direction of the arrows.
Figure 8:
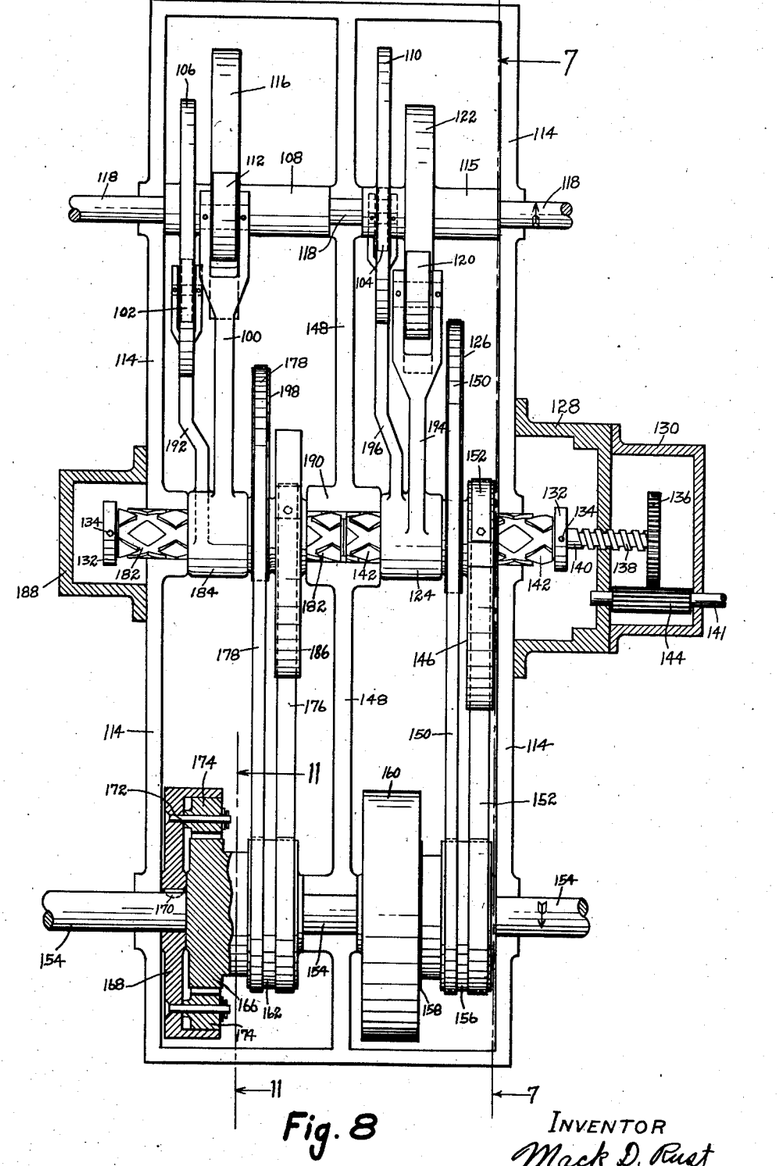
Fig. 8 is a sectional view of the same, taken on the line 8—8 of Fig. 7, looking in the direction of the arrows.
Figure 9:
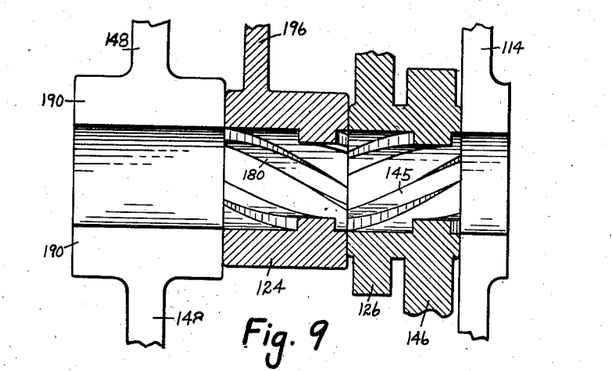
Fig. 9 is a detail sectional view illustrating particularly internal threads in certain parts of the embodiment shown in Figs. 7 and 8.

Particular reference is now made to Figs. 7 to 11, inclusive, which show another embodiment of my invention. Figs. 7 and 8 are drawn to scale. The transmission is enclosed and supported in a case 114, a portion of which is omitted from the drawings for the sake of clarity. An inner partition or wall 148 strengthens said case and assists in supporting the transmission. Rotatably mounted on the case 114 is the input shaft 118, to which are securely fastened two identical driving cams 122 and 116 in spaced relation, one of said cams being 180 degrees in advance of the other cam. Two identical return cams 110 and 106 are similarly fastened to the input shaft 118.

Figure 10:
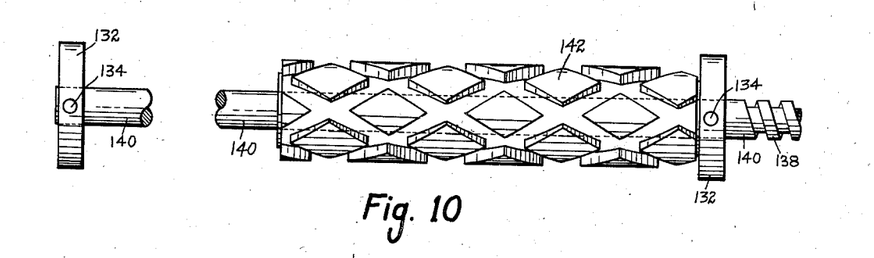
Fig. 10 is a detail plan view of the intermediate shaft of the same embodiment.

Two co-axial sleeves 142 and 182 are rotatably and slidably supported by suitable bearings in the case 114 and in the wall 148. A plurality of intersecting left-hand and right-hand threads are cut upon the external surfaces of each of said sleeves. An intermediate shaft 140 passes through the sleeves 142 and 182 and is rotatably supported thereby. Relative axial movement of said shaft and said sleeves is prevented by two collars 132 securely fastened to said shaft. A portion 138 of the shaft 140 extending beyond the sleeve 142 is threaded to mesh with cooperating threads in a housing 128 rigidly supported by the case 114. Fixed to the threaded portion 138 is a gear 136 which meshes with a pinion 144 fixed to a shaft 141 which is rotatably supported by an extension 130 of the housing 128. The shaft 141 is adapted to be driven by a motor or a handwheel. Fig. 10 is a view of the intermediate shaft assembly, showing in detail the threads on the surface of the sleeve 142.

An intermediate cam-like member 146 and a return cam-like member 126 securely fastened to a common hub are thereby supportably mounted upon the sleeve 142. These cam-like members are flat plates having irregular outlines and mounted perpendicular to the axis of their common hub. They differ from the well known cam in that they engage flexible steel bands (152 and 150) instead of rollers. Their action (as will be described below) is somewhat similar to that of a pulley and belt except that the speed ratio is variable due to their irregular outline, hence serving the same purpose as cams. A plurality of right-hand threads 145 are cut inside the said hub to mesh with the right-hand threads upon the surface of the sleeve 142. Two angularly displaced arms 194 and 196 securely fastened to a common hub 124 at right angles to the axis thereof are mounted upon the sleeve 142 adjacent the cam-like member 126.

A plurality of left-hand threads 180 are cut inside the hub 124 to mesh with the left-hand threads upon the surface of the same said sleeve. These internal threads are clearly shown in the detail sectional view, Fig. 9. The rollers 120 and 104 are rotatably supported at the bifurcated extremities of the arms 194 and 196 and roll upon the faces of the cams 122 and 110, respectively, in constant engagement therewith. A smaller assembly of internally threaded cam-like members 186 and 198 and arms 100 and 192 are similarly mounted upon the sleeve 182. The rollers 112 and 102 are similarly supported at the bifurcated extremities of the arms 100 and 192 and roll upon the faces of the cams 116 and 106, respectively, in constant engagement therewith.

Rotatably mounted in the case 114 is the output shaft 154 upon which are rotatably supported two driven drums 156 and 162. The intermediate cam-like member 146 and the return cam-like member 126 are connected to the drum 156 by flexible steel bands 152 and 150, respectively. The said bands are wound upon the surface of the drum 156 in opposite directions and the ends welded or otherwise securely fastened thereto so that rotation of said drum causes one band to wind thereon as the other band unwinds therefrom. The other end of the band 152 is securely fastened to the cam 146 at the inner end of its face by a suitable screw 164. The other end of the band 150 is yieldingly fastened to the cam-like member 126 at the outer end of its face by any suitable means permitting a certain amount of elasticity in the system of bands to prevent lost motion which would result from inaccuracies in manufacture and subsequent wear. Such means might consist of a stiff spring 153 securely fastened to the cam-like member 126 by the screw 157, said spring being in contact with said cam-like member only under said screw. The end of the band 150 is securely fastened to the free end of the spring 153 by the screws 151. In a similar manner, the intermediate cam-like member 186 and the return cam-like member 198 are connected to the drum 162 by flexible steel bands 176 and 178, respectively.

Two one-way drive clutches of the pawl and ratchet type consisting of the pawl wheels 160 and 168 and the respective ratchets 158 and 166 operatively connect the drums 156 and 162 to the output shaft 154. The said ratchets are securely fastened to the said drums and the pawl wheels 160 and 168 are securely fastened to the said output shaft by any suitable means such as by the key 170.

Figure 11:
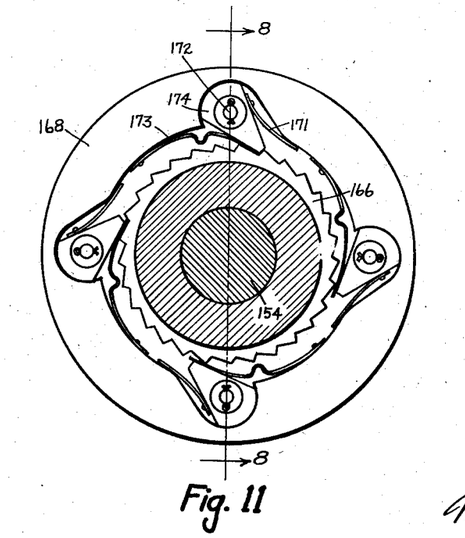
Fig. 11 is a sectional view of the one-way drive clutch taken on the line 11—11 of Fig. 8, looking in the direction of the arrows.

Referring particularly to Fig. 11, each of a plurality of pawls 174 is rotatably mounted in a semi-circular recess in the pawl wheel 168 by a supporting pin 172. A semi-circular portion of each pawl fits said recess in such a manner that driving force may be exerted between the ratchet 166 and the pawl wheel 168 through the said pawl without excessively loading said pins. A spring 171 constantly and yieldingly urges its associated pawl against the teeth of the ratchet 166. One end of each of a plurality of springs 173 is fastened to the pawl wheel 168. The free end of said spring is disposed between the pawl 174 and the teeth of the ratchet 166 in a manner such that when a tooth is not engaged, the spring extends slightly beyond the tip of the pawl. The several pawls occupy different positions relative to the particular teeth to which they are adjacent.

In operation, clockwise rotation of the ratchet 166 transmits no driving force to the pawl wheel 168 as the pawls slide freely from tooth to tooth. When the ratchet starts to rotate in a counter-clockwise direction, at least one of the springs 173 will be in a position to engage a tooth of the ratchet 166. As the ratchet continues to rotate in a counter-clockwise direction this said engaged spring will be deflected until its free end is flush with the tip of the adjacent pawl 174. The tooth and pawl are then in complete engagement and the ratchet 166 drives the pawl wheel 168 in a counter-clockwise direction. From the foregoing description, it is apparent that the purpose of the spring 173 is to prevent possible damage to pawls and teeth which might be caused by incomplete engagement, i. e., by engagement only at the tips of the teeth. The springs 173 wholly prevent any contact between any pawl and a tooth unless their relative positions are such as to permit complete engagement upon further counter-clockwise rotation of the pawl wheel 168. A partial engagement between a spring 173 and the tip of a tooth may occur, but no damage is done since the spring recedes and permits another pawl to take the load.

From the foregoing description of the second embodiment of my invention, it will be apparent that rotation of the input shaft 118 in the direction indicated by the arrow in Fig. 7 causes the driving cam 122, which engages the roller 120 mounted on the arm 194, to oscillate said arm about the intermediate shaft 140. Since the entire space between the case 114 and the bearing 190 is occupied by the hub 124 and the hub of the cam-like members 146 and 126, and furthermore, since the said hubs are threaded in opposite directions to mesh with threads on the surface of the sleeve 142, oscillation of the arm 194 causes oscillation of the sleeve 142 and the intermediate cam-like members 146 and 126 without causing any axial movement of said sleeves. The oscillatory motion of the said intermediate cam-like members is transmitted to the drum 156 and the ratchet 158 by the connecting bands 152 and 150. In a similar manner, the oscillation of the arm 100 causes oscillation of the drum 162 and the ratchet 166.

Each of the driving cams 122 and 116 has a rising portion adapted for driving its engaged roller, its associated intermediate cam-like members, and its associated ratchet in a power stroke for more than 180 degrees of rotation of said driving cam. Then, since the driving cams are disposed 180 degrees apart in angular position, one or the other, or both of the ratchets 158 and 166 always drives the output shaft 154, causing continuous rotation thereof in the direction of the arrow in Fig. 7.

The instantaneous ratio of the angular velocity of the cam-like member 146 to the angular velocity of the drum 156 depends upon the instantaneous effective radius of the cam-like member 146 (since the radius of the drum 156 is constant). The circumference of the drum 156 and the total length of the face of the cam-like member 146 are such that only a small portion of the band 152 is wound on and unwound from the said cam-like member and the said drum during a complete revolution of the input shaft 118. The speed ratio between the cam-like member 146 and the drum 156 can be varied by varying the angular position of the cam-like member 146 with respect to the angular position of the arm 194 on hub 124. This adjustment of the speed ratio is accomplished by rotating the intermediate shaft 140 by means of the gear 136 and the pinion 144. Rotation of the shaft 140 causes the threaded portion 138, cooperating with the threads in the housing 128, to move the shaft 140 and the sleeves 142 and 182 axially with respect to the hub 124 and cam-like members 146 and 126. As the said hub and cam-like members are prevented from moving axially by the assembly described, axial movement of the sleeve 142 results in angular rotation of the cam-like members 126 and 146 and the arm 194 in opposite directions with respect to said sleeve. A new portion of the face of the cam-like member 146, having a new effective radius, is therefore brought into play with the result that the speed ratio of the transmission is altered. Since a change in relative angular displacement of the cam-like member 146 and the arm 194 does not affect their oscillation about the shaft 140, there is no interruption of power flow while a change in speed ratio is being made.

In order to insure rotation of the output shaft 154 at uniform speed, the shape of the driving cam and intermediate cam-like members are carefully made in accordance with the same general law used in the design of the preferred embodiment of my invention as described in connection with Fig. 1. The shape of driving cam 122 is such that during the power stroke the angular displacement of arm 194 is proportional to the logarithm of the angular displacement of said driving cam. The shape of intermediate cam-like member 146 is such that the angular displacement of said intermediate cam-like member is proportional to the logarithm of the angular displacement of drum 156. It should be noted that in order to obtain the above stated relations between angular displacements, the actual shape of the cam-like members is not necessarily that of the simple logarithmic curve. The portion of driving cam 122 that is effective during the return stroke is shaped to permit the arm 194 to return to its position at the beginning of a power stroke in a manner similar to that described in connection with the preferred embodiment.

As the cams 122 and 116 can drive the engaged driven rollers 120 and 112 only during the power stroke, other means must be provided to drive said rollers during the return stroke. The return means, including the return cams 106 and 110 and return cam-like members 126, and 198, the arms 196 and 192, and the bands 150 and 178, provides forces in such direction as to return all oscillating parts to their initial position after each power stroke. The shape of the return cam 110 is such that during the power stroke the roller 104 is in constant engagement therewith while roller 120 rolls on the driving cam 122. The shape of the portion of the return cam 110 that is effective during the return stroke is such that the roller 120 is in constant engagement with the cam 122. The shape of the intermediate return cam-like member 126 is such as to maintain a slight tension in the band system at all times. The driving cam-like member 146 and the return cam-like member 126 are therefore complementary in the sense that when either one is unwinding its steel band, the other cam-like member is winding on its band at the same rate.

Figure 6:
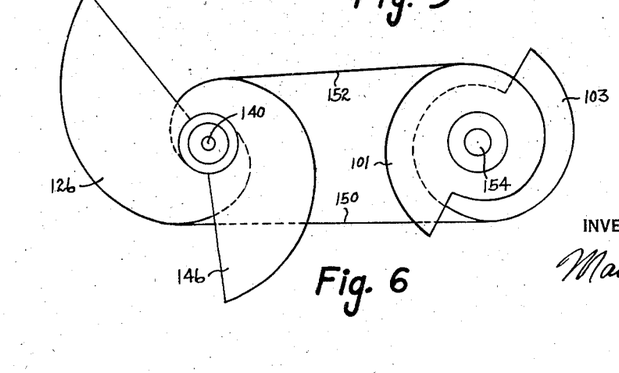
Fig. 6 is a schematic diagram of a modified form of certain parts of the embodiment shown in Figs. 7 and 8.

By using the modified design illustrated schematically in Fig. 6, it is possible to obtain a greater range of speed ratios without increasing the ratio of maximum to minimum radius of any one cam-like member. In the modified design, two drums 101 and 103 having a non-uniform radius replace the drum 156, which has a uniform radius. The surface of the drum 101 converges toward the center in such a direction that when the effective radius of cam-like member 146 is a minimum, the effective radius of drum 101 is a maximum, and vice versa. Then, since the speed ratio is proportional to the instantaneous ratio of the effective radius of the cam-like member 146 to the effective radius of the drum 101, a greater range of speed ratios is obtained by the construction described. It is important that the cam-like member 146 and the drum 101 be shaped so that the angular displacement of the cam-like member 146 is always proportional to the logarithm of the angular displacement of the drum 101, as was required of the design of the embodiment shown in Fig. 7. The shape of the return cam-like member 126 and the drum 103 is such as to maintain a slight tension in the bands 150 and 152 and to drive the drums 101 and 103 during the return stroke.

While I have shown and described two particular embodiments of my invention, it will be obvious to those skilled in the art that changes and modifications may be made without departing from my invention, and I, therefore, aim in the appended claims to cover all such changes and modifications as fall within the true spirit and scope of my invention.

What I claim and desire to obtain by United States Letters Patent is:

1. In an adjustable speed mechanism adapted to transform rotary motion into oscillatory motion and having an input shaft and an output member, a cam driven by said input shaft, an oscillatory member driven by said cam in power strokes such that equal increments in the angular displacement of said oscillatory member during said power stroke are caused by unequal increments in the angular displacement of said input shaft, each of said unequal increments being as great as a constant times the immediately preceding increment, means by which said oscillatory member drives said output member during said power strokes such that said equal increments in the angular displacements of said oscillatory member cause unequal increments in the angular displacement of said output member, each of said last-named unequal increments being as great as the same said constant times the immediately preceding increment, means for driving said oscillatory member and said output member during a return stroke between each two power strokes, and adjustable means for shifting the relative position of said output member and said oscillatory member such as to alter the displacement of said output member corresponding to the start of said power strokes, thereby altering the amplitude of oscillation of said output member.

2. In an adjustable speed mechanism adapted to transform rotary motion into oscillatory motion and having an input shaft and an output member, a cam driven by said input shaft, an oscillatory member driven by said cam in power strokes such that equal increments in the angular displacement of said oscillatory member during said power strokes are caused by unequal increments in angular displacement of said input shaft, the angular displacement of said input shaft after the addition of each of said unequal increments in turn being a constant times said angular displacement of said input shaft existing immediately prior to said addition, means by which said oscillatory member drives said output member during said power strokes such that said equal increments in the angular displacement of said oscillatory member cause unequal increments in the angular displacement of said output member, the angular displacement of said oscillatory member after the addition of each said last-named unequal increments being the same said constant times said angular displacement of said output member existing immediately prior to said last-named addition, means for driving said oscillatory member and said output member during a return stroke between each two power strokes, and adjustable means for shifting the relative position of said output member and said oscillatory member such as to alter the displacement of said output member corresponding to the start of said power strokes, thereby altering the amplitude of oscillation of said output member.

3. In an adjustable speed transmission adapted to transmit power at a speed ratio which is adjustable in a substantially infinite number of steps and having an input shaft and an output shaft, a plurality of channels each adapted for intermittent transmission of driving force, said channels being adapted to operate in a plurality of relative time phases such as to cooperatively transmit driving force substantially continuously, each of said channels including the following: a cam driven by said input shaft, a first oscillatory member driven by said cam in power strokes such that equal increments in the angular displacement of said first oscillatory member during said power strokes are caused by unequal increments in the angular displacement of said input shaft, the angular displacement of said input shaft after the addition of each of said unequal increments in turn being a constant times said angular displacement of said input shaft existing immediately prior to said addition, a second oscillatory member, means including a cam by which said first oscillatory member drives said second oscillatory member during said power strokes such that said equal increments in the angular displacement of said first oscillatory member cause unequal increments in the angular displacement of said second oscillatory member, the angular displacement of said second oscillatory member after the addition of each of said last-named unequal increments being the same said constant times said angular displacement of said second oscillatory member existing immediately prior to said last-named addition, means for driving said first oscillatory member and said second oscillatory member during a return stroke between each two power strokes, and one-way clutch means adapted to cause said second oscillatory member to drive said output shaft during said power stroke; and adjustable means for simultaneously shifting the position of each said second oscillatory member relative to each said first oscillatory member of the same channel such as to alter the displacement of said second oscillatory member corresponding to the start of said power strokes.

4. In a machine for transmitting rotative power at an adjustable speed ratio, an input rotative member, an output rotative member, a first intermediate member, a second intermediate member, a third intermediate member, a driving means for driving said first member by said input member such that during a part of a cycle of operation the displacement of said first member is proportional to the logarithm of the displacement of said input member, an adjustable coupling means for driving said second member by said first member such that during said part of said cycle the displacement of said second member is proportional to the displacement of said first member, a second driving means for driving said third member by said second member such that the displacement of said third member is proportional to the anti-logarithm of the displacement of said second member during said part of said cycle, one-way clutch means for driving said output member by said third member during said part of said cycle, and adjusting means for changing the displacement of said second member relative to said third member corresponding to any given instant of said part of said cycle.

5. In a variable speed transmission, an input shaft, an output shaft, and a plurality of channels for intermittent transmission of power, each of said channels being adapted to operate in different time passes such as to cooperatively transmit power substantially continuously, each of said channels including the following: a cam driven by said input shaft, an intermediate oscillatory member driven by said cam in power strokes such that the angular position of said intermediate member is proportional to the logarithm of the angular position of said input shaft during said power strokes, a second oscillatory member, means including a second cam by which said intermediate member drives said oscillatory member during said power strokes such that the angular position of said intermediate member is proportional to the logarithm of the angular position of said second oscillatory member, a one-way clutch adapted to cause said second oscillatory member to drive said output shaft during said power strokes, means for driving said intermediate oscillatory member and said second oscillatory member during a return stroke between each two power strokes, adjustable means for shifting the position of said intermediate oscillatory member relative to said second oscillatory member corresponding to the start of said power strokes, thereby causing a different portion of said second cam to be utilized.

6. In a variable speed transmission, an input shaft, an output shaft, and a plurality of channels for intermittent transmission of power, each of said channels being adapted to operate in different time phases such as to cooperatively transmit power substantially continuously, each of said channels including the following: a cam driven by said input shaft; an intermediate oscillatory member driven by said cam in power strokes such that the angular position of said intermediate member is proportional to the logarithm of the angular position of said input shaft during said power strokes; a second oscillatory member; means including a second cam by which said intermediate member drives said oscillatory member during said power strokes such that the angular position of said intermediate member is proportional to the logarithm of the angular position of said second oscillatory member; a one-way clutch adapted to cause said second oscillatory member to drive said output shaft during said power strokes; means for driving said intermediate oscillatory member and said second oscillatory member during a return stroke between each two power strokes, said means including a rotatable idler shaft, a plurality of return cams mounted on said idler shaft with one of said return cams adjacent a cam face on each said second oscillatory member, and a plurality of cam followers by means of which each of said return cams alternately drives and is driven by the associated said second oscillatory member; and adjustable means for shifting the position of said second oscillatory member relative to said intermediate oscillatory member corresponding to the start of said power strokes, thereby causing a different portion of said second cam to be utilized.

7. In an adjustable speed transmission having an input shaft and an output shaft and adapted to transmit power at a speed ratio which is adjustable in a substantially infinite number of steps, a plurality of channels each adapted for intermittent transmission of driving force, said channels being adapted to operate in a plurality of relative time phases such as to cooperatively transmit driving force substantially continuously, each of said channels including the following: a cam driven by said input shaft, a first oscillatory member driven by said cam in power strokes such that equal increments in the angular displacement of said first oscillatory member during said power strokes are caused by unequal increments in the angular displacement of said input shaft, each of said unequal increments being as great as a constant times the immediately preceding increment, a second oscillatory member, means including a cam by which said first oscillatory member drives said second oscillatory member during said power strokes such that said equal increments in the angular displacement of said first oscillatory member cause unequal increments in the angular displacement of said second oscillatory member, each of said last-named unequal increments being as great as the same said constant times the immediately preceding increment, and one-way clutch means adapted to cause said second oscillatory member to drive said output shaft during said power stroke; adjustable means for simultaneously shifting the position of each said second oscillatory member relative to each said first oscillatory member of the same channel such as to alter the displacement of said second oscillatory member corresponding to the start of said power strokes; and means for driving each said second oscillatory member during a return stroke including a rotatable idler shaft, a plurality of return cams mounted on said idler shaft with one of said return cams adjacent a cam face on each said second oscillatory member, and a plurality of cam followers by means of which each of said return cams alternately drives and is driven by the associated said second oscillatory member.

8. In a variable speed transmission, a driving cam, a pivoted member in engagement with said cam whereby said member is displaced angularly to transmit power as said cam is rotated, said cam being so shaped that during the power stroke the angular displacement of said member is proportional to the logarithm of the angular displacement of said cam, a second cam, means for driving said second cam through said member, a driven shaft, and means for driving said shaft through said second cam, said second cam being so shaped that the angular displacement of said member is proportional to the logarithm of the angular displacement of said second cam.

9. In a variable speed transmission, a driving cam, a pivoted member in engagement with said cam whereby said member is displaced angularly to transmit power as said cam is rotated, said cam being so shaped that during the power stroke the angular displacement of said member is proportional to the logarithm of the angular displacement of said cam, an output member, and means for driving said output member by said pivoted member such that the angular displacement of said pivoted member is proportional to the logarithm of the angular displacement of said output member.

10. In a variable speed transmission, an input shaft, an output shaft, a plurality of cams secured to said input shaft in a plurality of relative angular positions, a plurality of pivotally mounted oscillating members positioned one adjacent each cam and provided with suitable followers engaging said cams for causing movement in a power stroke and a return stroke of said oscillating member in response to continuous rotation of said input shaft, the shape of said cams being such that the angular displacement of each oscillating member is substantially proportional to the logarithm of the displacement of said input shaft during said power stroke, an intermediate member mounted coaxial with and adjacent each said oscillating member, adjustable means for coupling each said intermediate member to its associated oscillating member in adjustable relative angular positions, a secondary member associated with each said intermediate member, connecting means operatively connecting each said secondary member to its associated intermediate member such that the angular displacement of said intermediate member is substantially proportional to the logarithm of the angular displacement of said secondary member, and one-way clutch means for coupling each said secondary member to said output shaft.

11. In a device for transmitting power at an adjustable speed ratio, an input driving member, an intermediate member, means for driving said intermediate member intermittently by said driving member such that the displacement of said intermediate member during a part of a cycle of motion is substantially proportional to the logarithm of the displacement of said input driving member, a second member, means for driving said second member by said intermediate member at a fixed speed ratio, means for adjusting the displacement between said intermediate member and said second member, a third member, means for driving said third member by said second member such that the displacement of said second member is proportional to the logarithm of said third member, an output member, and means for driving said output member by said third member during said part of said cycle.

12. In a variable speed transmission, an input shaft, an output shaft, two similar pairs of cams fixed upon said input shaft, said pairs being positioned 180 degrees apart, two oscillatory followers having a common axis of rotation parallel to said input shaft, two pairs of rollers mounted with one pair upon each of said oscillatory followers and with each roller engaging one cam of said two pairs of cams such that each said oscillatory follower is positively driven in oscillatory motion by its associated pair of cams, two oscillatory members having axes common with said oscillatory followers and each associated with one said oscillatory follower, adjustable means for coupling each said oscillatory member to its associated oscillatory follower in adjustable relative angular position, two secondary members mounted upon said output shaft with one associated with each said oscillatory member, two sets of connecting means, each said set operatively connecting one said secondary member to its associated oscillatory member, each set of said connecting means including two pairs of pulleys, one pulley of each pair having non-uniform effective radius, and two non-continuous belts adapted to run one on each pair of pulleys, and two one-way clutch means for coupling each said secondary member to said output shaft.

13. The invention set forth in claim 12 further characterized in that each said oscillatory follower is driven by said input shaft during the power stroke of that said oscillatory follower such that the angular displacement of said oscillatory follower is proportional to a logarithm of the angular displacement of said input shaft and that during said power stroke the associated said secondary member is driven by that said follower through its associated oscillatory member and said connecting means such that the angular displacement of said associated oscillatory member is proportional to a logarithm (to the same base) of the angular displacement of said secondary member.

14. In a power transmission system for transforming rotary motion into a plurality of channels of oscillatory motion of different time phases, an input shaft, a plurality of cams mounted on said input shaft in a plurality of angular positions, a plurality of pivotally mounted oscillatory members positioned one adjacent each said cam and provided with suitable followers engaging said cams for causing movement of said oscillatory members in response to continuous rotation of said input shaft, a plurality of driven members each having a first and a second cam-like surface, a plurality of followers engaging said first cam-like surfaces by which said oscillatory members drive said driven members during power strokes and by which said driven members drive said oscillatory members during return strokes, a plurality of pivotally mounted return oscillatory members positioned one adjacent each said driven member, a second plurality of followers engaging said second cam-like surfaces by which said driven members drive said return oscillatory members during said power strokes and by which said return oscillatory members drive said driven members during said return strokes, an idler shaft, a plurality of return cams mounted on said idler shaft, and a plurality of suitable followers mounted one on each said return oscillatory member and engaging said return cams by which said return oscillatory members drive said idler shaft during said power strokes and by which said idler shaft drives said return oscillatory members during said return strokes.

15. In a variable speed transmission, a first member, a second member movable relative to said first member, cam means operatively interposed between said first member and said second member whereby said first member drives said second member, said cam means being so constructed and arranged that said second member is restricted to bodily motion along a substantially fixed path relative to said first member, an input cam adapted to drive said first member in repeating cycles such as to cause motion of said second member relative to said first member along a part of said fixed path, adjusting means for adjusting the position of said second member relative to said first member along said fixed path corresponding to a given part of said cycle thereby causing a different part of said fixed path to be utilized, an output member, and means for driving said output member by said second member during a part of said cycle.

16. The invention of claim 15 characterized in that said input cam drives said first member such that the displacement of said first member is proportional to the logarithm of the angular displacement of said input cam during a part of said cycle and in that for fixed settings of said adjusting means the displacement of said second member is proportional to the anti-logarithm of the displacement of said first member during said last-named part of said cycle.

17. In a variable speed transmission, a driving cam having a first center of rotation, a first member adapted to be driven in power strokes about a second center of rotation by said cam, a second member, means for driving said second member by said first member in strokes about a third center of rotation, an output member adapted to be driven by said second member during said strokes, and means for adjusting the position of said third center exclusively along a circular path about said second center relative to said first center.

18. In a variable speed transmission, a rotatable driving cam, a first member, means for driving said first member by said driving cam in power strokes along a path, a second member, means for driving said second member by said first member along a part of a second and predetermined continuous path relative to said first member, an output member, means for driving said output member by said second member during said power strokes, and means for adjusting exclusively along said second path the position of said second member corresponding to the start of said power strokes, such that after adjustment a different part of said second path is traversed by said second member.

19. In a variable speed transmission, a first member, a driving cam for driving said member in oscillatory motion whereby said member is displaced along a path to transmit power as said cam is rotated, said cam being so shaped that during the power stroke the displacement of said first member along said path is proportional to a logarithm of the angular displacement of said driving cam, a second member, means for driving said second member by said first member along a second and predetermined path relative to said first member such that the angular displacement of said first member is proportional to a logarithm of the angular displacement of said second member, an output member adapted to be driven by said second member during said power stroke, and means for adjusting the position of said second member exclusively along said second path corresponding to the start of said power stroke.

20. In an adjustable speed mechanism, an input shaft, a cam mounted on said input shaft, an oscillatory member adapted to be driven in power strokes by said cam such that the displacement of said oscillatory member is proportional to a logarithm of the angular displacement of said cam during a part of each of said power strokes, an output member, adjusting means, means including a second cam and associated engaging member for driving said output member by said oscillatory member, said second cam having a complete working range exceeding the range engaged during the execution of a single of said power strokes for a given setting of said adjusting means and being so shaped that the displacement of said oscillatory member is proportional to a logarithm of the displacement of said output member, said adjusting means being operable to change the angular position of said second cam relative to said oscillatory member corresponding to the start of said power stroke such as to cause a different range of said second cam to be engaged during execution of said power strokes, and means for driving said oscillatory member and said output member in a return stroke after each of said power strokes.

21. In a variable speed transmission, a structure, a first cam rotatably supported in said structure, a frame, a second cam rotatably supported in said frame, a member adapted to oscillate about an axis, said member engaging said first cam and said second cam such as to be driven by said first cam and to drive said second cam upon rotation of said first cam, and means for adjusting the angular position of said frame with respect to said structure about said axis.

MACK D. RUST.